United States Patent
Miyazawa

(10) Patent No.: US 10,680,378 B2
(45) Date of Patent: Jun. 9, 2020

(54) WIRE COVER AND CONNECTOR

(71) Applicant: Sumitomo Wiring Systems, Ltd., Yokkaichi, Mie (JP)

(72) Inventor: Kiyohito Miyazawa, Mie (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 16/260,416

(22) Filed: Jan. 29, 2019

(65) Prior Publication Data

US 2019/0237897 A1   Aug. 1, 2019

(30) Foreign Application Priority Data

Jan. 31, 2018   (JP) .................................. 2018-014784

(51) Int. Cl.

| | | |
|---|---|---|
| *H01R 13/516* | (2006.01) | |
| *H01R 13/50* | (2006.01) | |
| *H02G 3/04* | (2006.01) | |
| *H01R 13/52* | (2006.01) | |
| *H02G 3/06* | (2006.01) | |
| *H01R 13/56* | (2006.01) | |

(52) U.S. Cl.
CPC ....... *H01R 13/501* (2013.01); *H01R 13/5213* (2013.01); *H02G 3/04* (2013.01); *H02G 3/0468* (2013.01); *H02G 3/0691* (2013.01); *H01R 13/516* (2013.01); *H01R 13/562* (2013.01)

(58) Field of Classification Search
CPC ................................................. H01R 13/501; H01R 13/5213; H01R 13/516; H01R 13/562; H02G 3/04
See application file for complete search history.

(56) References Cited

U.S. PATENT DOCUMENTS

| | | | | | |
|---|---|---|---|---|---|
| 5,480,312 A | * | 1/1996 | Watanabe | ............ | H01R 13/443 439/135 |
| 5,571,030 A | * | 11/1996 | Gladd | ................ | H01R 13/4367 439/188 |
| 5,688,142 A | * | 11/1997 | Dietz | ................. | H01R 13/6272 439/352 |
| 5,839,911 A | * | 11/1998 | Dinkel | ................. | H01R 13/582 439/470 |
| 6,364,683 B1 | * | 4/2002 | Kohno | ............... | H01R 13/6273 439/188 |
| 6,478,608 B1 | * | 11/2002 | Grant | ................... | H01R 13/506 439/456 |

(Continued)

FOREIGN PATENT DOCUMENTS

JP   2002-025685   1/2002

*Primary Examiner* — Truc T Nguyen
(74) *Attorney, Agent, or Firm* — Gerald E. Hespos; Michael J. Porco; Matthew T. Hespos

(57) ABSTRACT

A wire cover (30) is to be mounted on a housing (10) having wires (W) drawn out from a wire draw-out surface (12) on a rear end and including a cut portion (25) open in an outer peripheral surface and includes a tubular holding portion (31) configured to surround an outer periphery of the housing (10), and a projection (38) formed on an inner surface of the tubular holding portion (31) and configured to restrict forward separation of the housing (10) from the tubular holding portion (31) by being fit into the cut portion (25). Since a front stop wall to which a front surface of the housing (10) is to be locked need not be formed on a front end of the tubular holding portion (31), miniaturization in a front-rear direction can be realized.

4 Claims, 15 Drawing Sheets

(56) References Cited

U.S. PATENT DOCUMENTS

| | | | | |
|---|---|---|---|---|
| 9,647,371 B2* | 5/2017 | Thurau | ................ | H01R 13/436 |
| 2002/0009932 A1 | 1/2002 | Inaba et al. | | |
| 2003/0199193 A1* | 10/2003 | Amemiya | .......... | H01R 13/5812 |
| | | | | 439/470 |
| 2004/0014367 A1* | 1/2004 | Petersen | .............. | H01R 13/514 |
| | | | | 439/669 |
| 2004/0102082 A1* | 5/2004 | Tsuji | .................... | H01R 13/562 |
| | | | | 439/470 |
| 2008/0305673 A1* | 12/2008 | Kinsey, Jr. | ........... | H01R 13/506 |
| | | | | 439/367 |
| 2010/0068930 A1* | 3/2010 | Endo | .................... | H01R 13/501 |
| | | | | 439/595 |
| 2014/0357116 A1* | 12/2014 | Suzuki | ................ | H01R 13/447 |
| | | | | 439/527 |

* cited by examiner

WIRE COVER AND CONNECTOR

BACKGROUND

Field of the Invention

The invention relates to a wire cover and a connector.

Related Art

Japanese Unexamined Patent Publication. No. 2002-025684 discloses a connector in which a wire cover is mounted on a housing and wires drawn out from the rear end surface of the housing are inserted through the wire cover. The wire cover includes a tubular holding portion surrounding the outer periphery of the housing. A stopper is formed on a front end part of the tubular holding portion and is locked to the outer peripheral edge of the front end surface of the housing from the front. Further, left and right opening and closing members are formed on the wire cover and are locked to the housing from behind. The locking of the stopper and the opening and closing members restricts relative movements of the tubular holding portion and the housing in a front-rear direction.

The stopper on the front part of the tubular holding portion is configured to contact the front surface of the housing from the front. Thus, the stopper makes the wire cover and the connector large in the front-rear direction.

The invention was completed on the basis of the above situation and aims to realize miniaturization.

SUMMARY

A wire cover according to a first aspect of the invention is to be mounted on a housing having a wire drawn out from a wire draw-out surface on a rear end. The wire cover includes a cut portion open in an outer peripheral surface, and includes a tubular holding portion configured to surround an outer periphery of the housing. A projection is formed on an inner surface of the tubular holding portion and is configured to restrict forward separation of the housing from the tubular holding portion by being fit into the cut portion.

A connector according to a second aspect of the invention includes a housing having a wire drawn out from a wire draw-out surface on a rear end and includes a cut portion open in an outer peripheral surface. A wire cover is mounted on the housing and has a tubular holding portion that surrounds an outer periphery of the housing. A projection is formed on an inner surface of the tubular holding portion and is configured to restrict forward separation of the housing from the tubular holding portion by being fit into the cut portion.

The wire cover and the connector of the invention do not require a front stop wall on a front end of the tubular holding portion and to which a front part of the housing is to be locked. Thus, miniaturization in a front-rear direction can be realized.

The tubular holding portion may include a housing box formed with the projection and a housing lid configured to open and close an opening of the housing box. The housing lid may be locked to the housing box while overlapping an outer surface of the housing box to restrict expansion deformation of the housing box. According to this configuration, a displacement of the projection in a direction to be disengaged from the cut portion can be restricted by restricting expansion deformation of the housing box. Thus, the projection and the cut portion are fit reliably.

The housing box portion of one embodiment includes a bottom wall and two side walls rising from side edge parts of the bottom wall, and the housing lid is connected to a rising end edge of one of the side walls via a hinge. According to this configuration, the housing box portion and the housing lid are configured as a single component, so that the number of components can be reduced.

A tapered guiding surface may be formed on the projection and may face toward the opening of the housing box. According to this configuration, in mounting the housing into the housing box, the housing slides in contact with the tapered guiding surface when coming into contact with the projection. Thus, there is no possibility that the housing and the projection catch each other.

In one embodiment, a wire surrounding portion is connected to a rear end of the tubular holding portion and is configured to surround the wire. Additionally, the wire surrounding portion includes a wire box connected to the housing box and a wire lid configured to open and close an opening of the wire box. The wire lid overlaps on the outer surface of the housing lid. According to this configuration, the opening of the housing lid is restricted by the wire lid overlapping on the outer surface of the housing lid. Thus, the housing can be held reliably held in the tubular holding portion.

The wire cover may include a wire surrounding portion connected to a rear end of the tubular holding portion and configured to surround the wire. The wire surrounding portion may include a wire box connected to the housing box and a wire lid configured to open and close an opening of the wire box. The wire lid overlaps on the outer surface of the housing lid. According to this configuration, since the opening of the housing lid is restricted by the wire lid overlapping on the outer surface of the housing lid, the housing can be held reliably in the tubular holding portion.

The cut portion of one embodiment penetrates through an outer wall covering an outer surface of a lock arm to expose a part of the lock arm. The lock arm is resiliently displaceable toward the cut, and the projection is arranged at such a position as not to interfere with the lock arm. According to this configuration, there is no possibility that a resilient displacement of the lock arm is hindered by the projection.

The cut portion of one embodiment penetrates through an outer wall covering an outer surface of a lock arm to expose a part of the lock arm. The lock arm is resiliently displaceable toward the cut, and an escaping portion configured to avoid interference with the lock arm is formed in an inner surface of the tubular holding portion. According to this configuration, there is no possibility that a resilient displacement of the lock arm is hindered by the tubular holding portion.

DETAILED DESCRIPTION

An embodiment of the invention is described with reference to FIGS. 1 to 15. A connector of this embodiment includes a housing 10 made of synthetic resin and a wire cover 30 made of synthetic resin and to be assembled with the housing 10. In the following description, an oblique left-lower side in FIGS. 1, 7, 8, 10 and 13 is defined as a front side concerning a front-rear direction. Upper and lower sides shown in FIGS. 1, 2, 4, 7, 8, 10, 11, 13 and 14 are directly defined as upper and lower sides concerning a vertical direction. Left and right sides shown in FIGS. 2, 3, 9, 11 and 12 are directly defined as left and right sides concerning a lateral direction.

<Housing 10>

Figure 13:
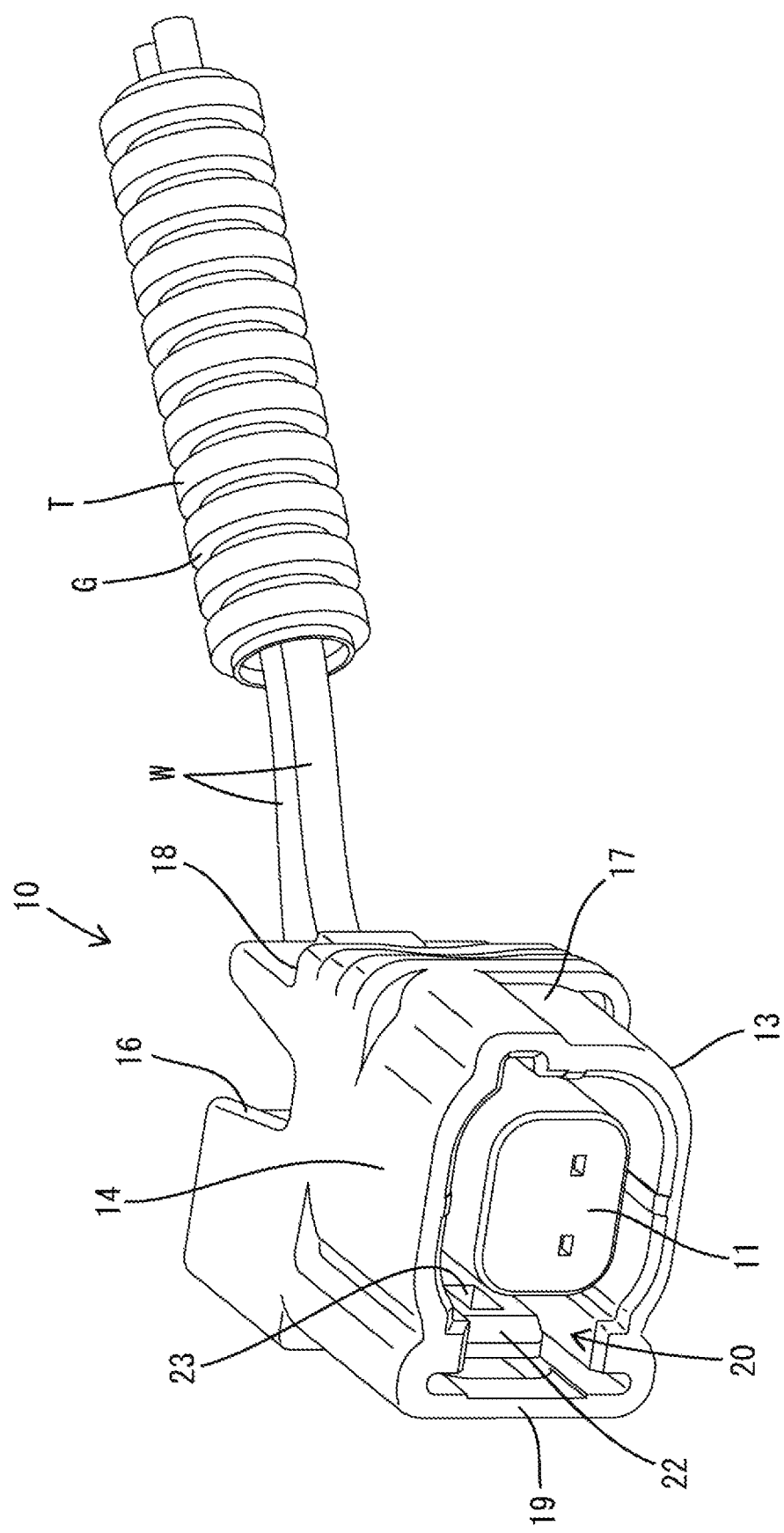
FIG. 13 is a perspective view showing a state where wires are drawn out from a wire draw-out surface of the housing.
Figure 14:
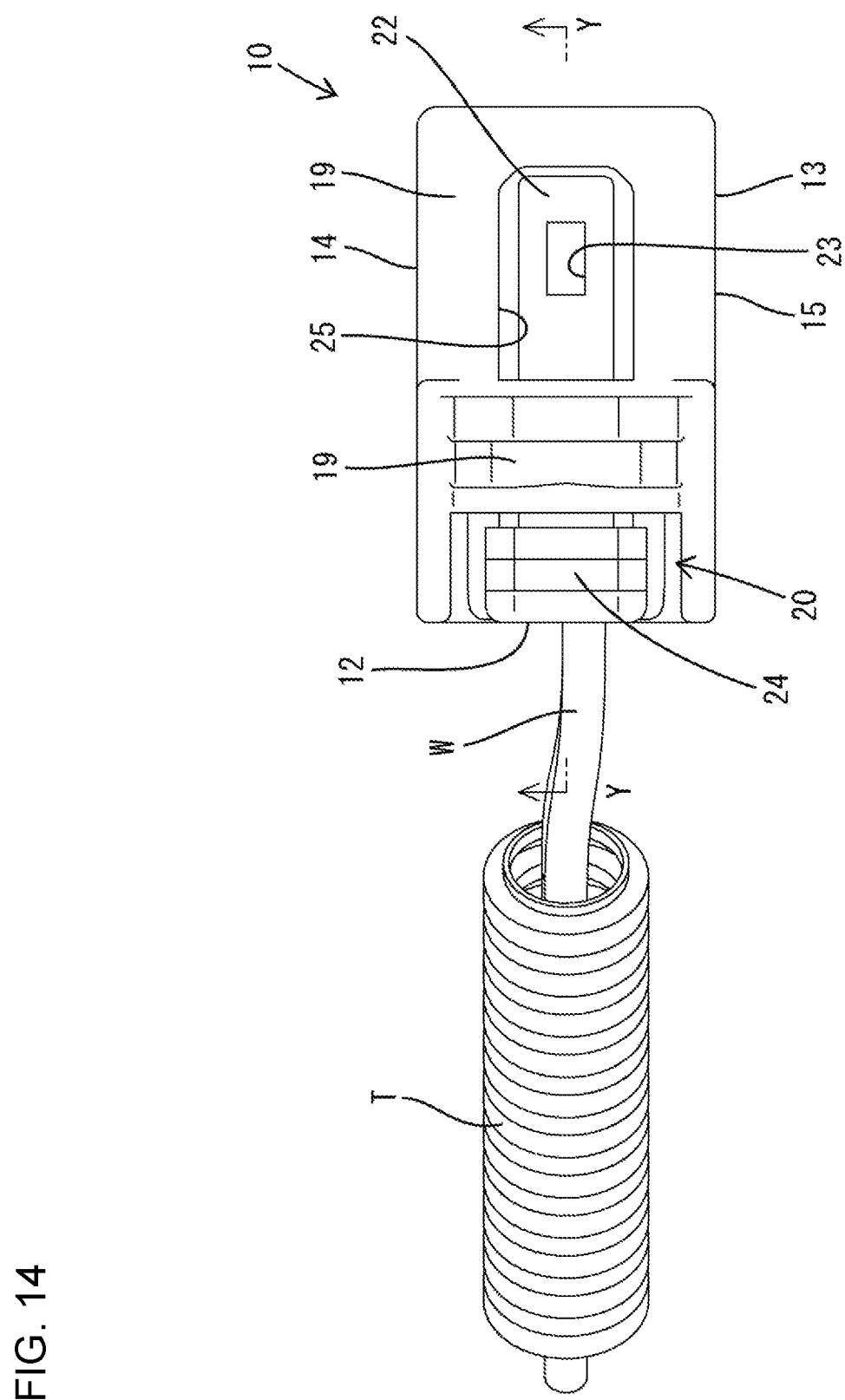
FIG. 14 is a side view showing the state where the wires are drawn out from the wire draw-out surface of the housing.
Figure 15:
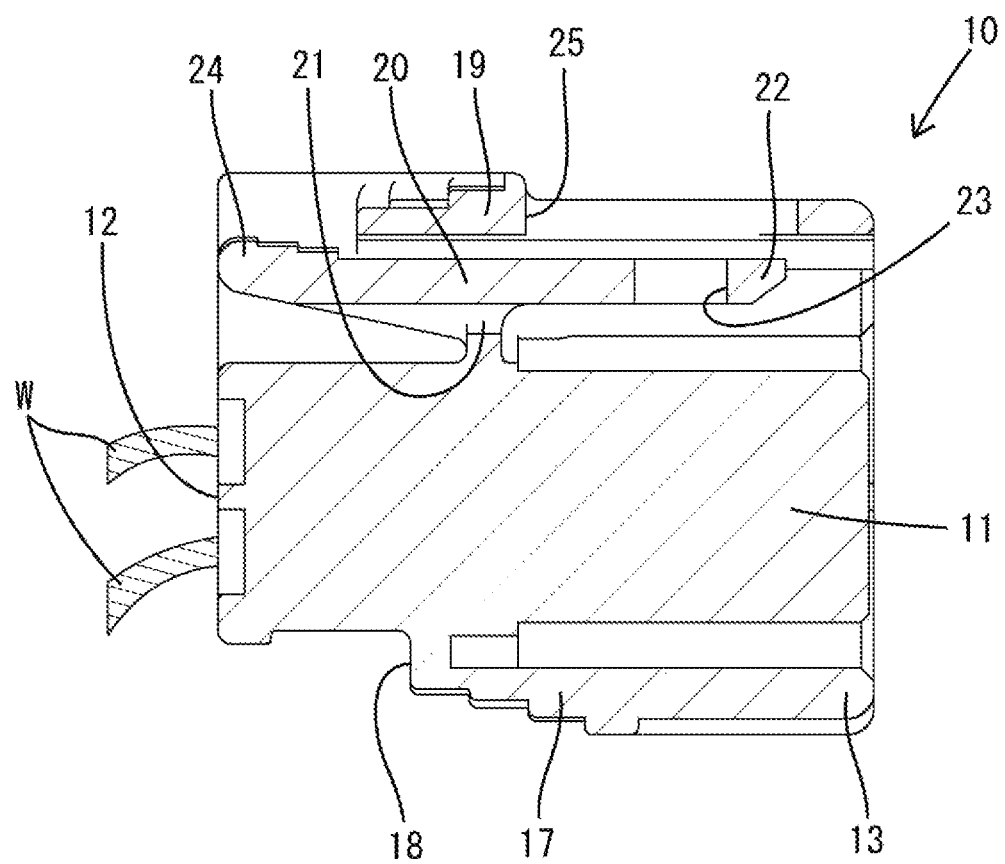
FIG. 15 is a section along Y-Y of FIG. 14.

As shown in FIGS. 13 to 15, the housing 10 includes a block-shaped terminal accommodating portion 11 and a peripheral wall 13 surrounding the terminal accommodating portion 11. Terminal fittings (two in this embodiment, although not shown) are accommodated in the terminal accommodating portion 11. Two wires W individually connected to the terminal fittings are drawn out rearward from a wire draw-out surface 12 on the rear end surface of the housing 10 (terminal accommodating portion 11). The wires W are inserted into a corrugated tube T having grooves G formed in a circumferential direction on an outer periphery.

The peripheral wall 13 is in the form of a frame having a substantially rectangular shape in a front view. Recesses 16 cut forward from rear end edges are formed in rear end parts of an upper wall 14 and a lower wall 15 constituting the peripheral wall 13. The peripheral wall 13 includes a right outer wall 17 facing and at a distance from the right outer side surface of the terminal accommodating portion 11. A rear end part of the right outer wall 17 is located forward of the rear end of the terminal accommodating portion 11 and functions as a stepped contact portion 18.

The peripheral wall 13 includes a left outer wall 19 (outer wall portion as claimed) facing and at a distance from the left outer side surface of the terminal accommodating portion 11. A plate-like lock arm 20 long in the front-rear direction is accommodated between the terminal accommodating portion 11 and the left outer wall 19. The lock arm 20 is disposed with a plate thickness direction oriented in the lateral direction, and a coupling portion 21 located substantially in a central part of the lock arm 20 in the front-rear direction is connected to the left outer side surface of the terminal accommodating portion 11. An area of the lock arm 20 in front of the coupling 21 serves as a lock functioning portion 22 including a penetrating lock 23. An operating portion 24 to be pressed in unlocking the lock arm 20 is formed on a rear end part of the lock arm 20.

The left outer wall 19 is formed with a cut portion 25 penetrating through the left outer wall 19 in the lateral direction (wall thickness direction). As shown in FIG. 14, the cut portion 25 has a substantially rectangular shape in a side view. Only the lock functioning portion 22 of the lock arm 20 in front of the coupling portion 21 can be seen through the cut portion 25 from the outside (left side) of the left outer wall 19. In other words, the lock functioning portion 22 is exposed on the outer peripheral surface of the left outer wall 19 (housing 10) in the cut portion 25.

Figure 6:
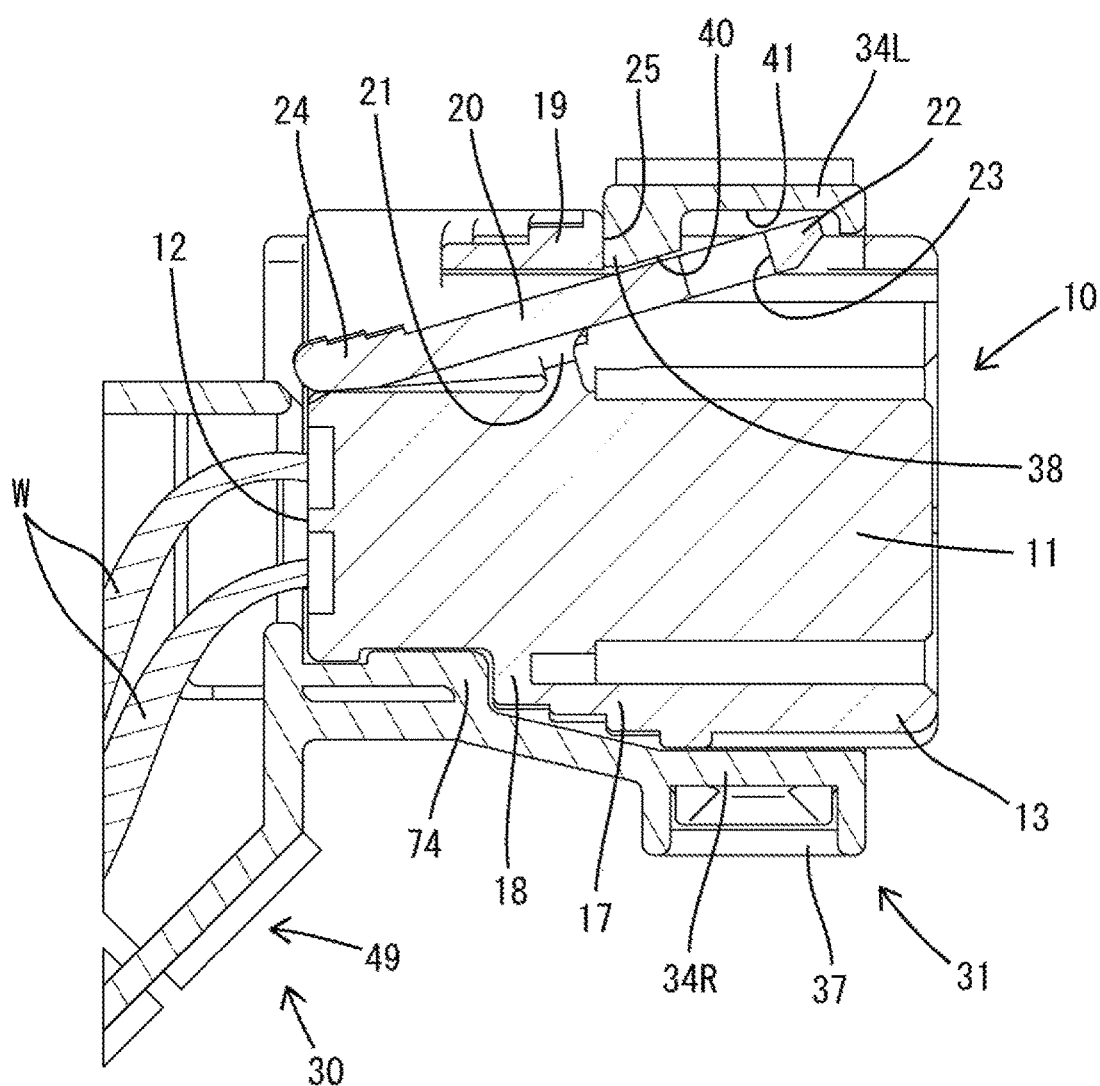
FIG. 6 is a section along X-X f FIG. 4 showing a state where a lock arm is resiliently displaced.

The lock arm 20 is resiliently deformable like a seesaw with the coupling portion 21 as a supporting point to displace the lock functioning portion 22 in a direction away from the terminal accommodating portion 11 (leftward) and displace the operating portion 24 in a direction toward the terminal accommodating portion 11 (rightward). When the lock arm 20 is deformed resiliently in an unlocking direction, the lock functioning portion 21 enters the cut portion 25 and a front end part of the lock functioning portion 22 projects out from the outer surface of the left outer wall 19, as shown in FIG. 6.

<Wire Cover 30>

As shown in FIGS. 1 and 10 to 12, the wire cover 30 is a single member including a tubular holding portion 31 for accommodating and holding the housing 10, a wire surrounding portion 49 for accommodating the wires W in a bent state near the rear end of the housing 10, and a tubular positioning portion 62 for positioning a front end part of the corrugated tube T. The wire cover 30 has a tubular shape as a whole and is bent substantially into an L shape in a plan view.

The tubular holding portion 31 is configured by coupling a housing box portion 32 and a housing lid portion 44 via a first hinge portion 43 (hinge portion as claimed). The housing box portion 32 includes a bottom wall portion 33, a right side will portion 34R (side wall portion as claimed) rising upward from the right side edge of the bottom wall portion 33 and a left side wall portion 34L (side wall portion as claimed) rising upward from the left side edge of the bottom wall portion 33. A box-side rib 35 in the form of a projection is formed on a rear end part of the upper surface of the bottom wall portion 33. The box-side rib 35 is fit into the lower recess 16 of the housing 10. A lock projection 36 and a frame-shaped separation restricting portion 37 surrounding the lock projection 36 are formed on the outer surface of the right side wall portion 34R.

A formation area of the left side wall portion 34L in the front-rear direction is a range from the front end of the bottom wall portion 33 to a substantially center position of the bottom wall portion 33 in the front-rear direction. A formation area of the right side wall portion 34R in the front-rear direction is a range from the front end to the rear end of the bottom wall portion 33. An internal space of the housing box portion 32 is open to the entire front surface, the entire rear surface, the entire upper surface and a rear end area of the left side surface of the housing box portion 32.

Figure 5:
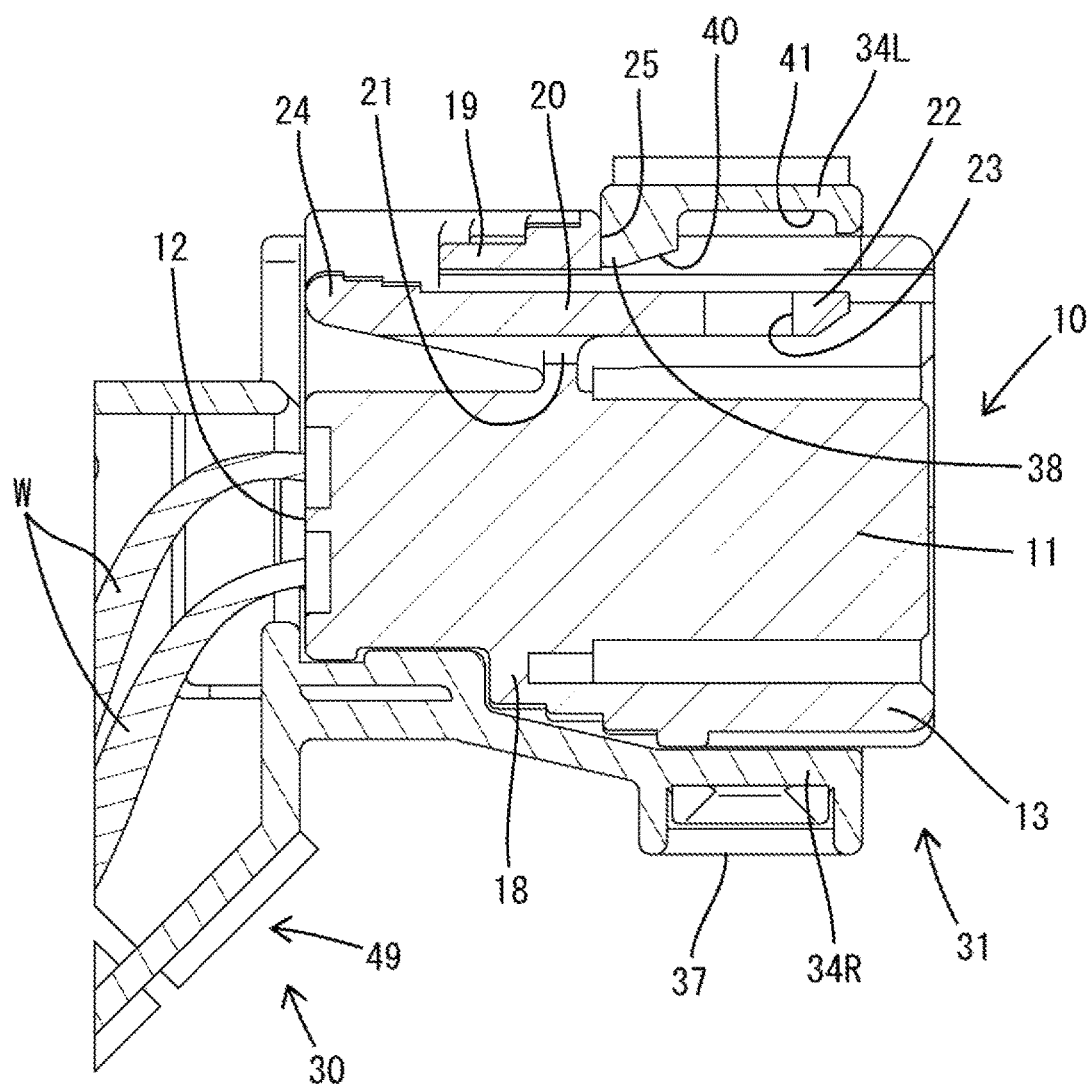
FIG. 5 is a section along X-X of FIG. 4.
Figure 10:
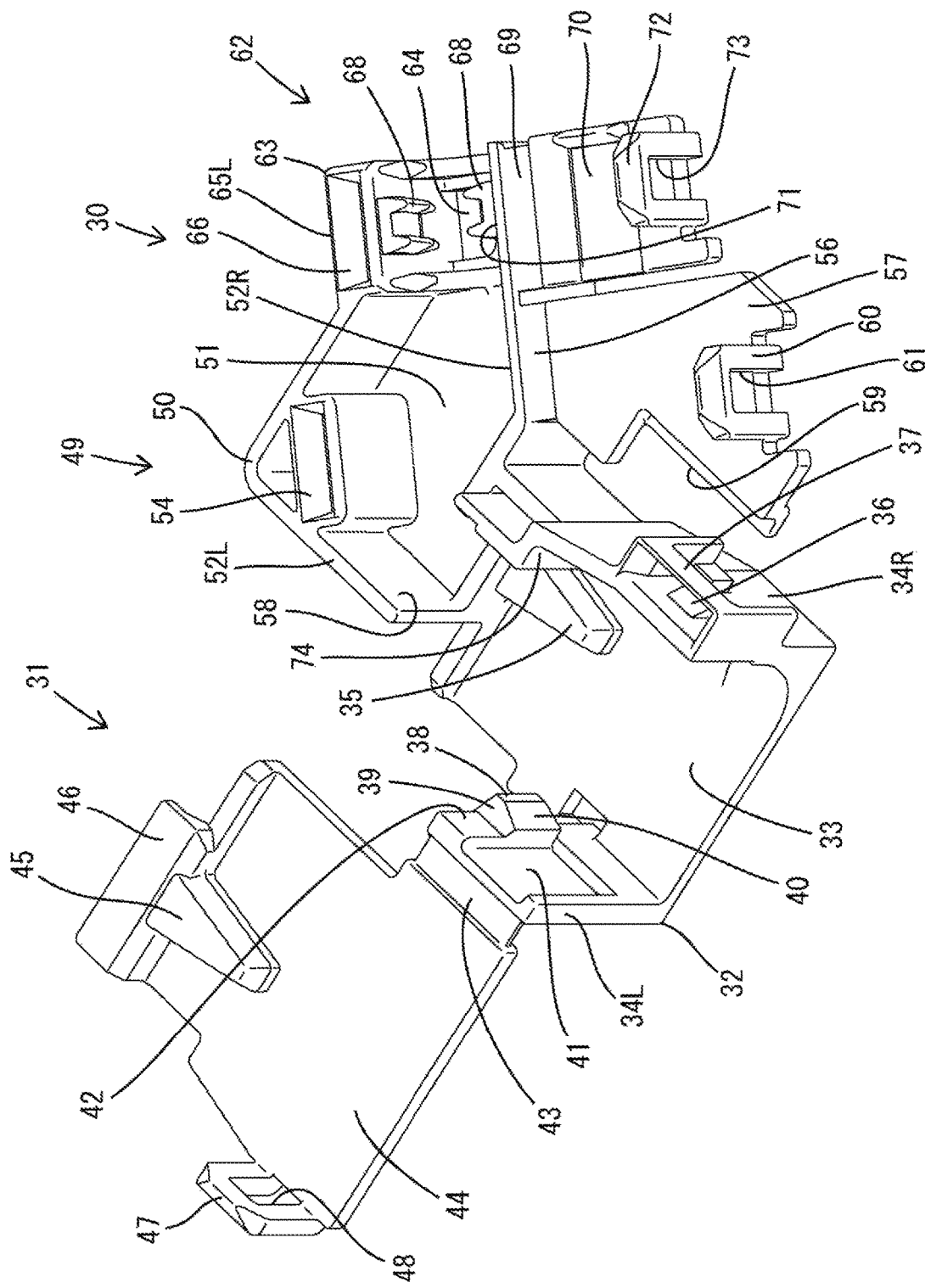
FIG. 10 is a perspective view of the wire cover.
Figure 11:
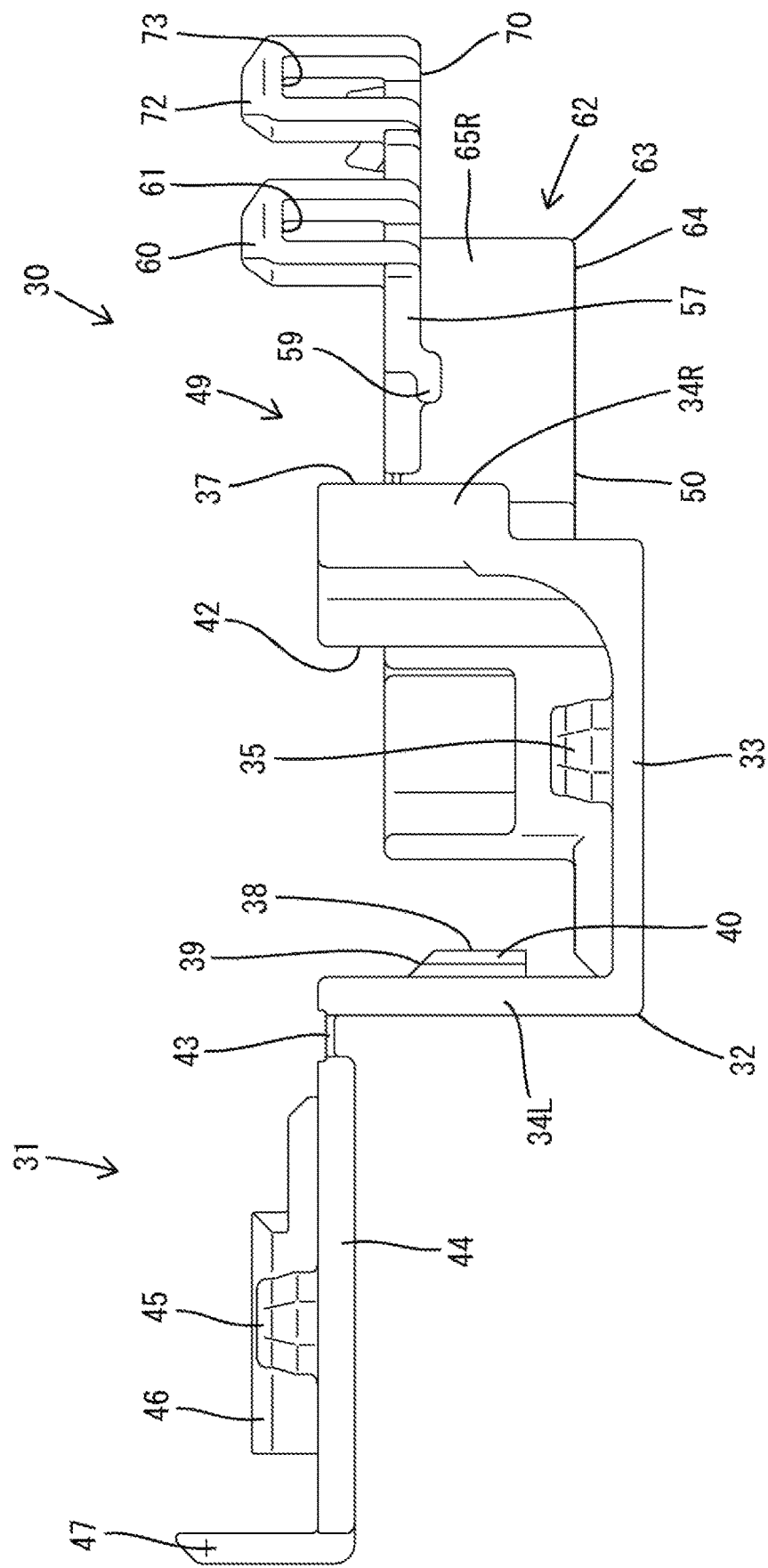
FIG. 11 is a front view of the wire cover.
Figure 12:
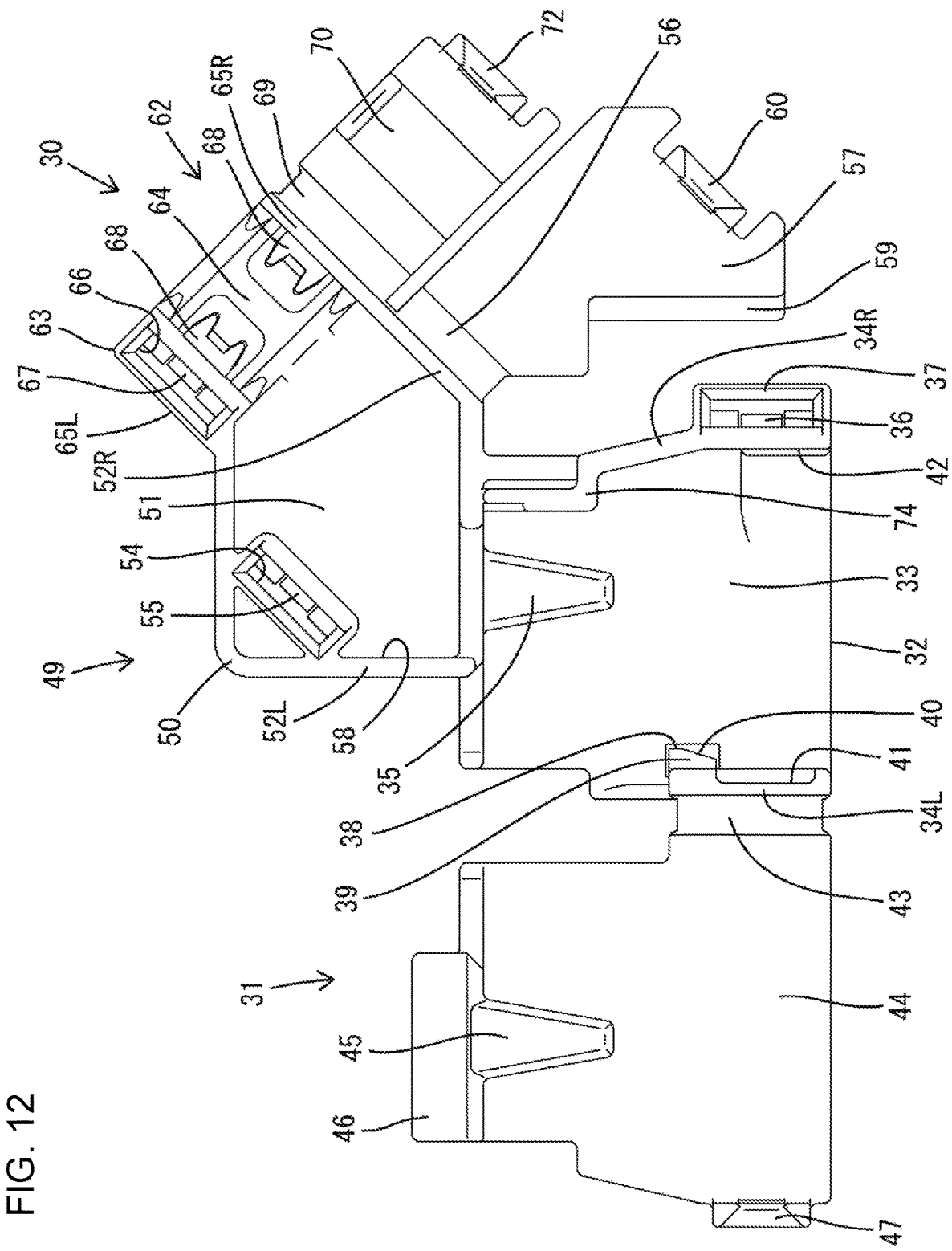
FIG. 12 is a plan view of the wire cover.

A projection 38 is formed on a rear end part of the inner surface of the left side wall portion 34L. As shown in FIGS. 10 and 11, a guiding surface 39 inclined downward toward the right is formed on the upper surface (surface facing an opening 42 in the upper surface of the housing box portion 32) of the projection 38. As shown in FIGS. 5, 6 and 12, an inclined surface 40 inclined to obliquely face a right-front side in a plan view is formed on the right side surface of the projection 32. Interference between the lock arm 20 and the projection 38 is avoided by this inclined surface 40. Further, an escaping portion 41 is formed in an area of the inner surface of the left side wall portion 34L forward of the projection 38 by recessing the left side wall portion 34L to thin the left side wall portion 34L. Interference between the lock arm 20 and the left side wall portion 34L is avoided by this escaping portion 41.

The housing box portion 44 is substantially in the form of a flat plate and connected to the upper end edge of the left side wall portion 34L via the first hinge portion 43. The housing lid portion 44 is displaced between an opening position for opening the opening 42 in the upper surface of the housing box portion 32 (see FIGS. 7 and 10 to 12) and a closing position for closing the opening 42 of the housing box portion 32 (see FIGS. 1 to 4, 8 and 9) with the first hinge portion 43 as a supporting point. A lid-side rib 45 in the form of a projection is formed on a rear end part of the housing lid portion 44. With the housing lid portion 44 located at the closing position, the lid-side rib 45 is located on an inner surface side of the tubular holding portion 31 and fit into the upper recess 16 of the housing 10. The housing lid portion 44 is formed with a receiving portion 46 in the form of a rib extending along the rear end edge of the housing lid portion 44.

The housing lid portion 44 is formed with a resilient lock piece 47. The resilient lock piece 47 is in the form of a cantilever extending substantially at a right angle from a side edge part on a side opposite to the first hinge portion 43 out of left and right side edge parts of the housing lid portion 44. The resilient lock piece 47 is formed with a lock hole 48. When the housing lid portion 44 is displaced to the closing position, the resilient lock piece 47 overlaps on the outer surface of the right side wall portion 34R and the lock projection 36 is locked into the lock hole 48.

By the locking of the lock hole 48 and the lock projection 36, the housing lid portion 44 is locked in a state assembled with the housing box portion 32, thereby constituting the tubular holding portion 31. Further, the resilient lock piece 47 is fit to the frame-shaped separation restricting portion 37, whereby the resilient lock piece 47 is held in a state overlapping on the outer surface of the right side wall portion 34R and the lock hole 48 and the lock projection 36 are held locked. In the above manner, the tubular holding portion 31 is retained in a rectangular tube shape.

The wire surrounding portion 49 is configured by coupling a wire box portion 50 and a wire lid portion 57 via a second hinge portion 56. The wire box portion 50 includes a first bottom plate portion 51 connected to the bottom wall portion 33 of the housing box portion 32, a first left side plate portion 52L rising upward from the left side edge and rear edge of the first bottom plate portion 51 and a first right side plate portion 52R rising upward from the front edge and right side edge of the first bottom plate portion 51. An operation space 53 is present between the front end of the first left side plate portion 52L and the rear end of the left side wall portion 34L of the housing box portion 32. The front end of the first right side wall portion 52R is connected to the rear end of the right side wall portion 34R of the housing box portion 32. A first locking space 54 is formed in the inner surface of the first left side plate portion 52L and a first locking projection 55 (see FIGS. 9 and 12) is formed in the first locking space 54.

The wire lid portion 57 is substantially in the form of a flat plate and connected to the upper end edge of the first right side plate portion 52R via the second hinge portion 56. The wire lid portion 57 is displaced between an opening position for opening an opening 58 in the upper surface of the wire box portion 50 (see FIGS. 7 to 12) and a closing position for closing the opening 58 of the wire box portion 50 (see FIGS. 1 to 4) with the second hinge portion 56 as a supporting point. The wire lid portion 57 is formed with a pressing portion 59 in the form of a rib extending along the front end edge of the wire lid portion 57.

The wire lid portion 57 is formed with a first resilient lock piece 60. The first resilient lock piece 60 is in the form of a cantilever extending substantially at a right angle from a side edge part on a side opposite to the second hinge portion 56 out of left and right side edge parts of the wire lid portion 57. The resilient lock piece 60 is formed with a first lock hole 61. When the wire lid portion 57 is displaced to the closing position, the first resilient lock piece 60 is inserted into the first locking space 54 and the first locking projection 55 is locked into the first lock hole 61. By the locking of the first lock hole 61 and the first locking projection 55, the wire lid portion 57 is locked in a state assembled with the wire box portion 50, thereby constituting the wire surrounding portion 49. The front end of the wire surrounding portion 49 communicates with the rear end of the tubular holding portion 31.

The tubular positioning portion 62 is configured by coupling a positioning box portion 63 and a positioning lid portion 70 via a third hinge portion 69. The positioning box portion 63 includes a second bottom plate portion 64 connected to the bottom plate portion 51 of the wire box portion 50, a second left side plate portion 65L rising upward from the left side edge of the second bottom plate portion 64 and a second right side plate portion 65R rising upward from the right side edge of the second bottom plate portion 64. The front end of the second left side wall portion 65L is connected to the rear end of the first left side plate portion 52L of the wire box portion 50. The front end of the second right side wall portion 65R is connected to the rear end of the first right side plate portion 52R of the wire box portion 50. A second locking space 66 is formed in the second left side plate portion 65L and a second locking projection 67 is formed in the second locking space 66. Positioning protrusions 68 are formed on the inner surface of the second left side plate portion 65L and that of the second right side plate portion 65R.

The positioning lid portion 70 is substantially in the form of a flat plate and connected to the upper end edge of the second right side plate portion 65R via the third hinge portion 69. The positioning lid portion 70 is displaced between an opening position for opening an opening 71 in the upper surface of the positioning box portion 63 (see FIGS. 7 to 12) and a closing position for closing the opening 71 of the positioning box portion 63 (see FIGS. 1 to 4) with the third hinge portion 69 as a supporting point.

The positioning lid portion 70 is formed with a second resilient lock piece 72. The second resilient lock piece 72 is in the form of a cantilever extending substantially at a right angle from a side edge part on a side opposite to the third hinge portion 69 out of left and right side edge parts of the positioning lid portion 70. The resilient lock piece 72 is formed with a second lock hole 73. When the positioning lid portion 70 is displaced to the closing position, the second resilient lock piece 72 is inserted into the second locking space 66 and the second locking projection 67 is locked into the second lock hole 73. By the locking of the second lock hole 73 and the second locking projection 67, the positioning lid portion 70 is locked in a state assembled with the positioning box portion 63, thereby constituting the tubular positioning portion 62. The front end of the tubular positioning portion 62 communicates with the rear end of the wire surrounding portion 49 and an opening in the rear end of the tubular positioning portion 62 is open to the outside of the wire cover 30.

<Functions and Effects of Embodiment 30>

The procedure of assembling the housing 10 and the wire cover 30 is described. In the wire cover 30, any of the housing lid portion 44, the wire lid portion 57 and the positioning lid portion 70 is displaced to the opening position and, in this state, the housing 10 is accommodated into the housing box portion 32. At this time, the housing 10 is dropped in between the both left and right side wall portions 34L, 34R from above the wire cover 30 and the stepped contact portion 18 is fit to slide in contact with a stepped stopper 74 formed on the right side wall portion 34R of the wire cover 30.

In the fitting process, the left outer wall portion 19 interferes with the projection 38, but the tapered guiding surface 39 is formed on the upper end part of the projection 38. Thus, the left outer wall portion 19 slides in contact with the guiding surface 39 without being caught by the upper end part of the projection 38. As the left outer wall portion 19 and the guiding surface 39 slide in contact, the both left and right side wall portions 34L, 34R are resiliently expanded and deformed. Since the left outer wall portion 19 slides in contact with the projecting end surface of the projection 38 after passing through the guiding surface 39, the both left and right side wall portions 34L, 34R are kept expanded and deformed during this time.

Figure 7:
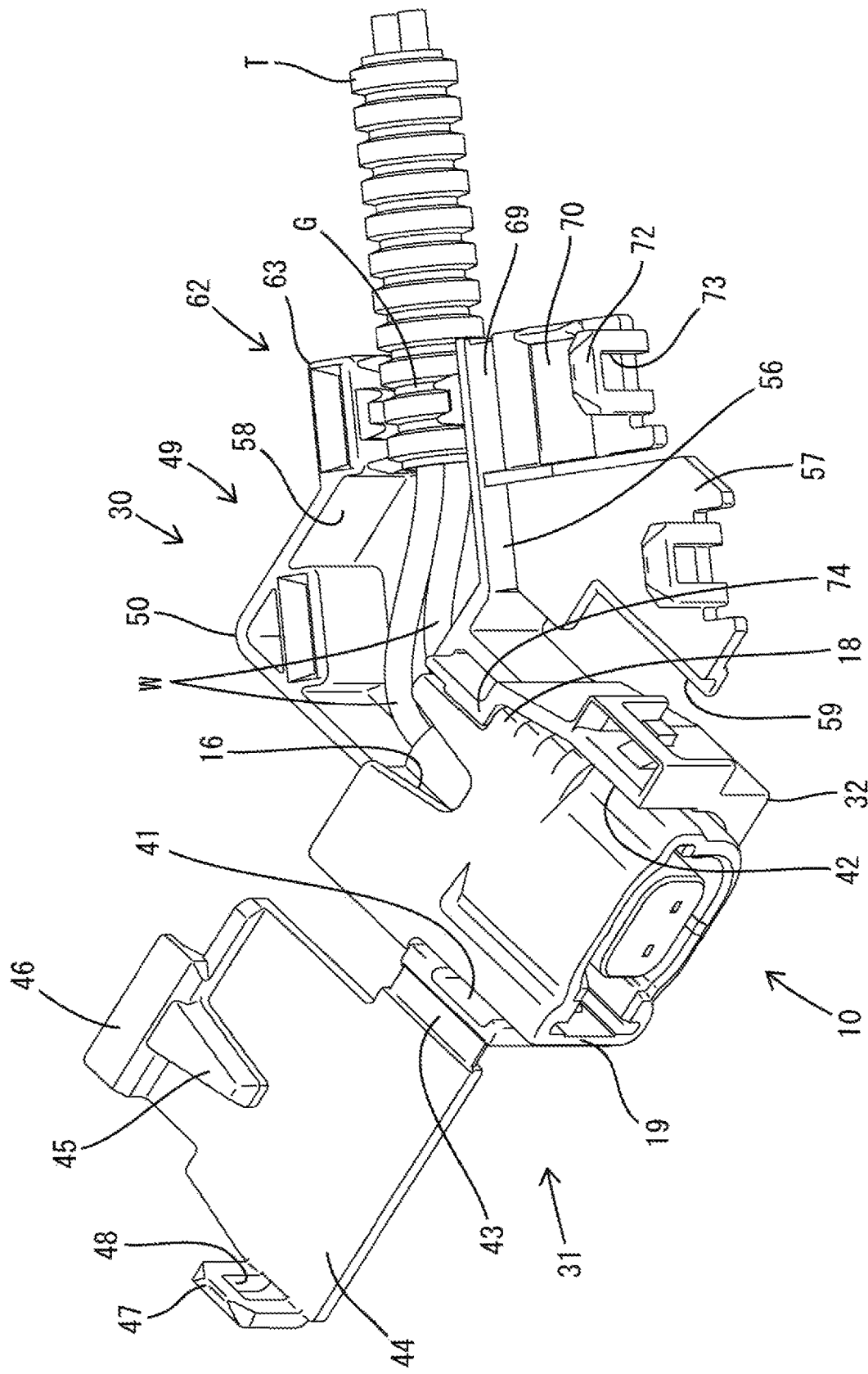
FIG. 7 is a perspective view showing a state where a housing is fit in a housing box portion of a wire cover in the process of assembling the housing and the wire cover.

When the housing 10 is properly accommodated into the housing box portion 32 as shown in FIG. 7, the both left and right side wall portions 34L, 34R resiliently return to hold and sandwich the housing 10 from left and right sides and the projection 38 enters the cut portion 25 of the housing 10 to be fit to the cut portion 25. By this fitting, upward separation of the housing 10 from the housing box portion 32 is restricted. Further, the rear end edge of the cut portion 25 is locked to the projection 38 from behind, thereby restricting a forward relative displacement of the housing 10 with respect to the wire cover 30. Furthermore, the stepped contact portion 18 is locked to the stepped stopper 74 from front, thereby restricting a rearward relative displacement of the housing 10 with respect to the wire cover 30.

In the above manner, the housing 10 is held fit in the housing box portion 32. In the fit state, the wire draw-out surface 12 is facing the internal space of the wire box portion 50. After the housing 10 is fit into the housing box portion 32, the wires W drawn out rearward from the wire draw-out surface 12 are accommodated into the wire box portion 50 and obliquely turned to a right-rear side. Further, the front end part of the corrugated tube T is fit into the positioning box portion 63 and the groove portion G on the outer periphery of the corrugated tube T is fit to the positioning protrusions 68. In this way, the front end part of the corrugated tube T is positioned with respect to the wire cover 30 (positioning box portion 63).

Figure 8:
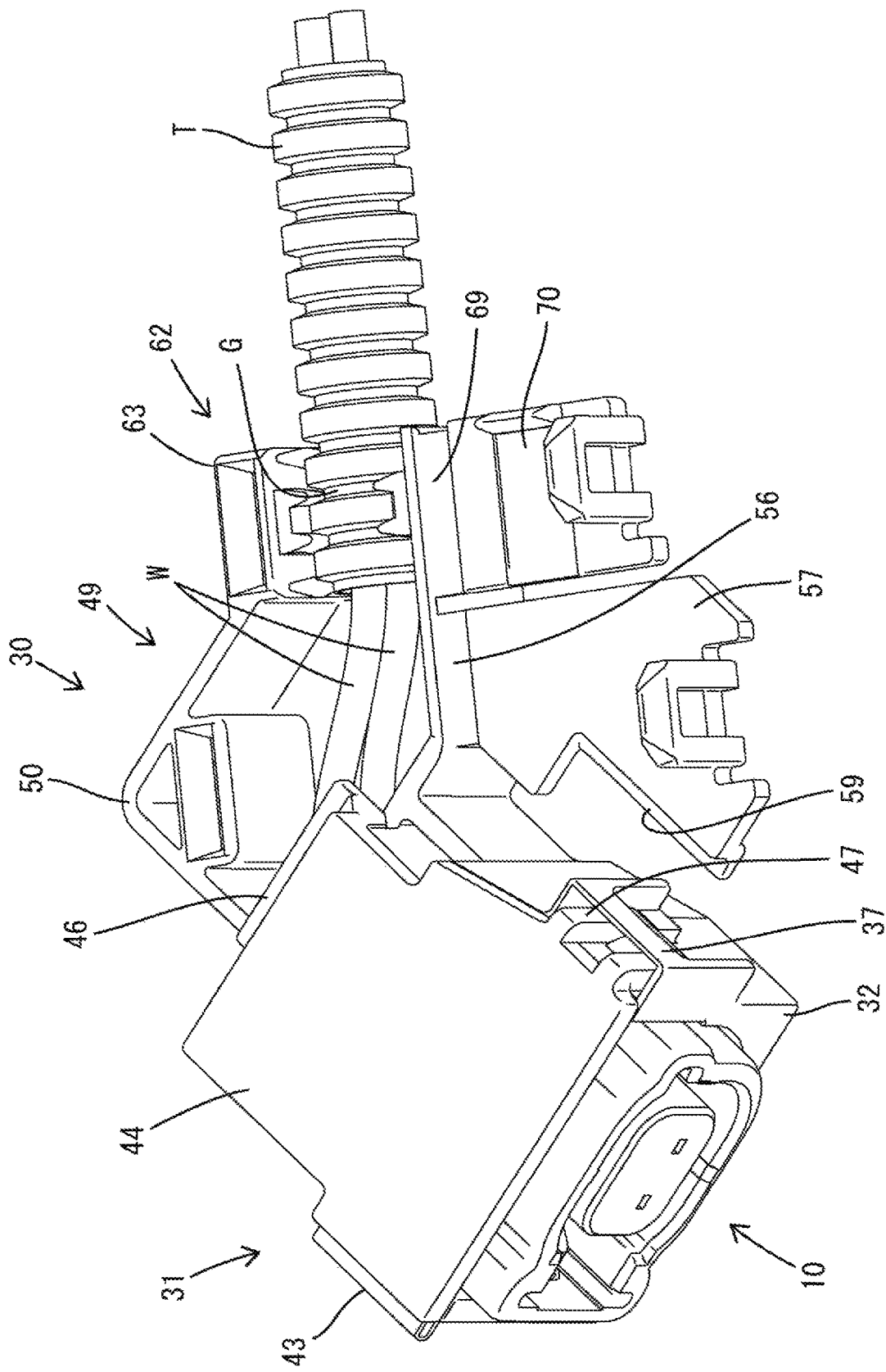
FIG. 8 is a perspective view showing a state where an opening of the housing box portion is closed by a housing lid portion in the process of assembling the housing and the wire cover.
Figure 9:
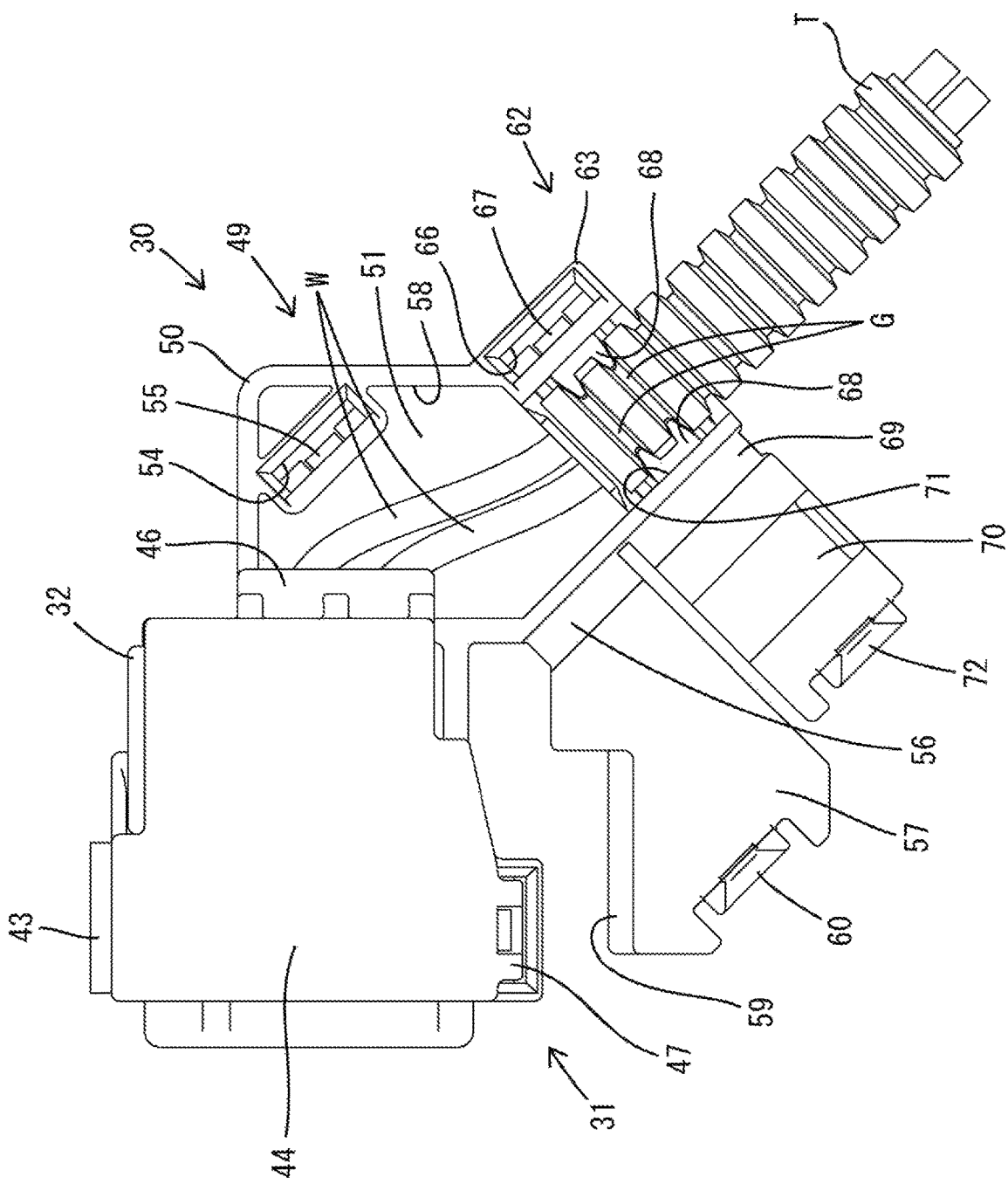
FIG. 9 is a plan view showing the state where the opening of the housing box portion is closed by the housing lid portion in the process of assembling the housing and the wire cover.

Thereafter, as shown in FIGS. 8 and 9, the housing lid portion 44 is displaced to the closing position. In this way, the opening 42 of the housing box portion 32 is closed and the upper surface of the housing 10 is covered by the housing lid portion 44 to constitute the tubular holding portion 31 surrounding and holding the housing 10 over the entire periphery. The tubular holding portion 31 is retained in the rectangular tube shape by the locking of the resilient lock piece 47 and the lock projection 36.

With the housing lid portion 44 assembled with the housing box portion 32, the resilient lock piece 47 extending from the right side edge part of the housing lid portion 44 is locked to the lock projection 36 while overlapping on the outer surface of the right side wall portion 34R. Since the left side edge part of the housing lid portion 44 is connected to the upper end edge of the left side wall portion 34L via the first hinge portion 43, the both left and right side wall portions 34L, 34R are restricted from being expanded and deformed in the lateral direction to ensure a locking margin of the projection 38 and the rear edge part of the cut portion 25.

In addition, both the projection 38 and the resilient lock piece 47 are arranged at positions forward of a center of the tubular holding portion 31 in the front-rear direction and the resilient lock piece 47 is restricted from being separated from the outer surface of the right side wall portion 34R by the separation restricting portion 37. In this way, a leftward relative displacement of the projection 38 with respect to the cut portion 25 is reliably restricted.

Figure 1:
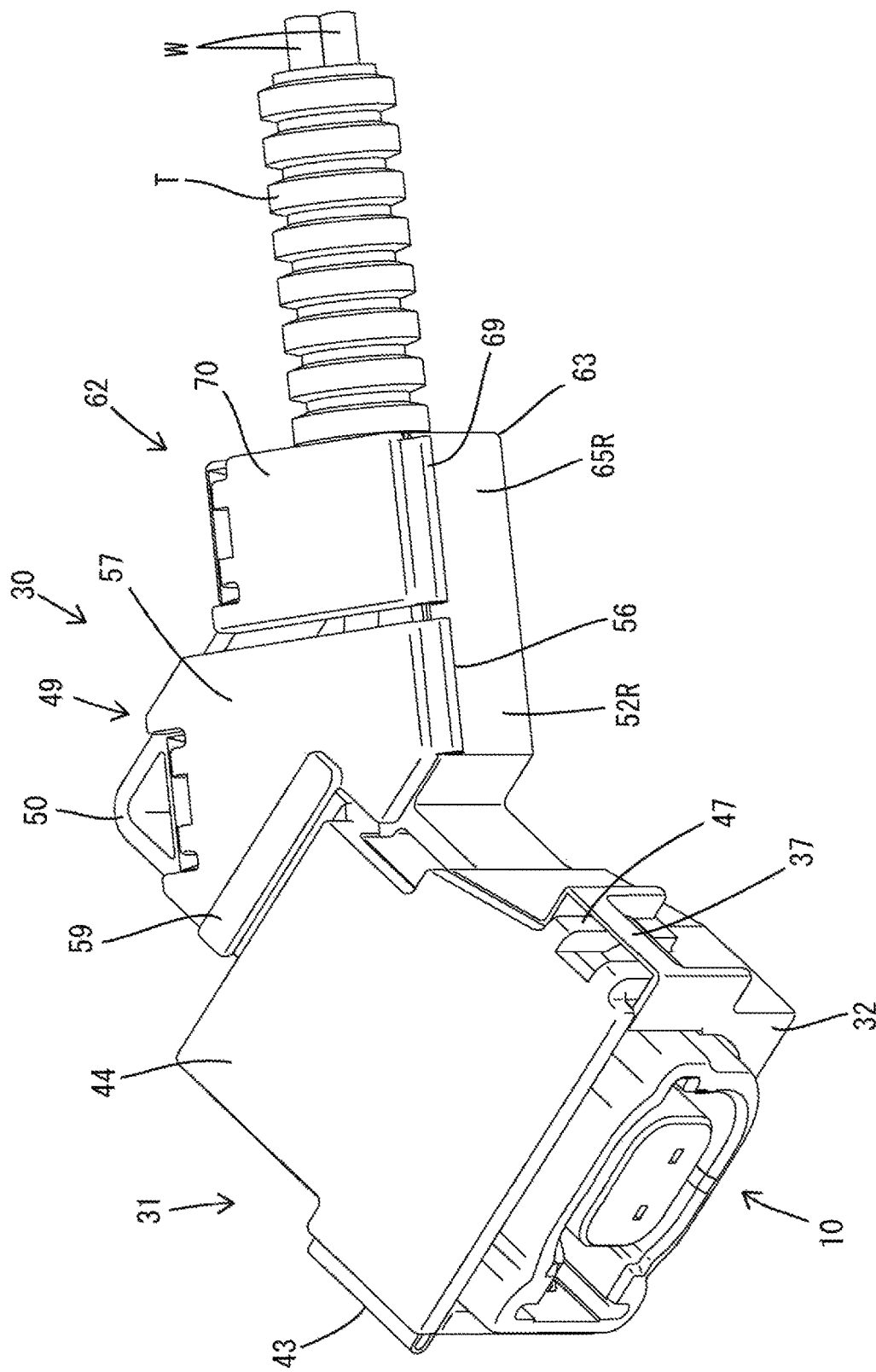
FIG. 1 is a perspective view showing an assembled state of a connector of one embodiment.
Figure 2:
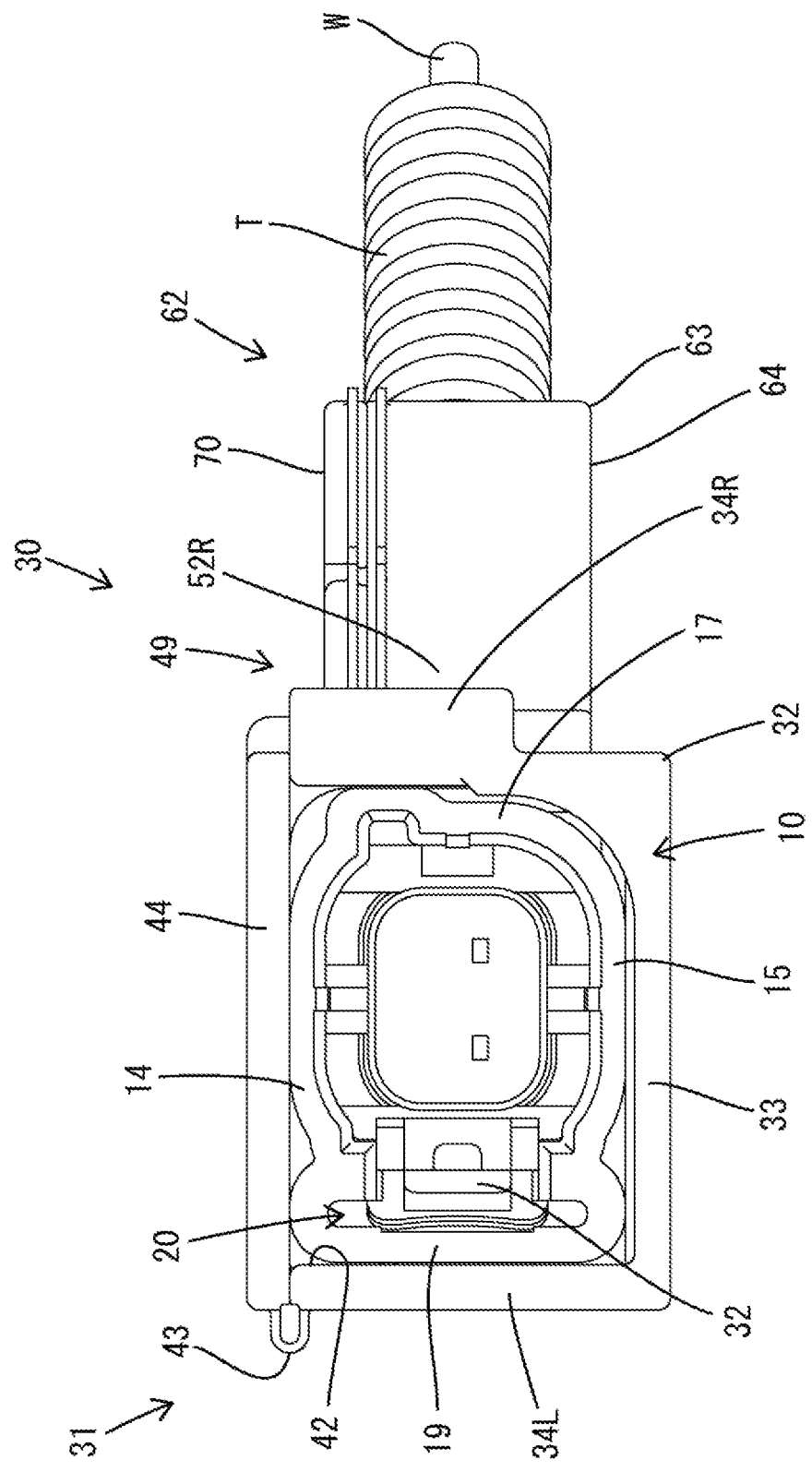
FIG. 2 is a front view showing the assembled state of the connector.
Figure 3:
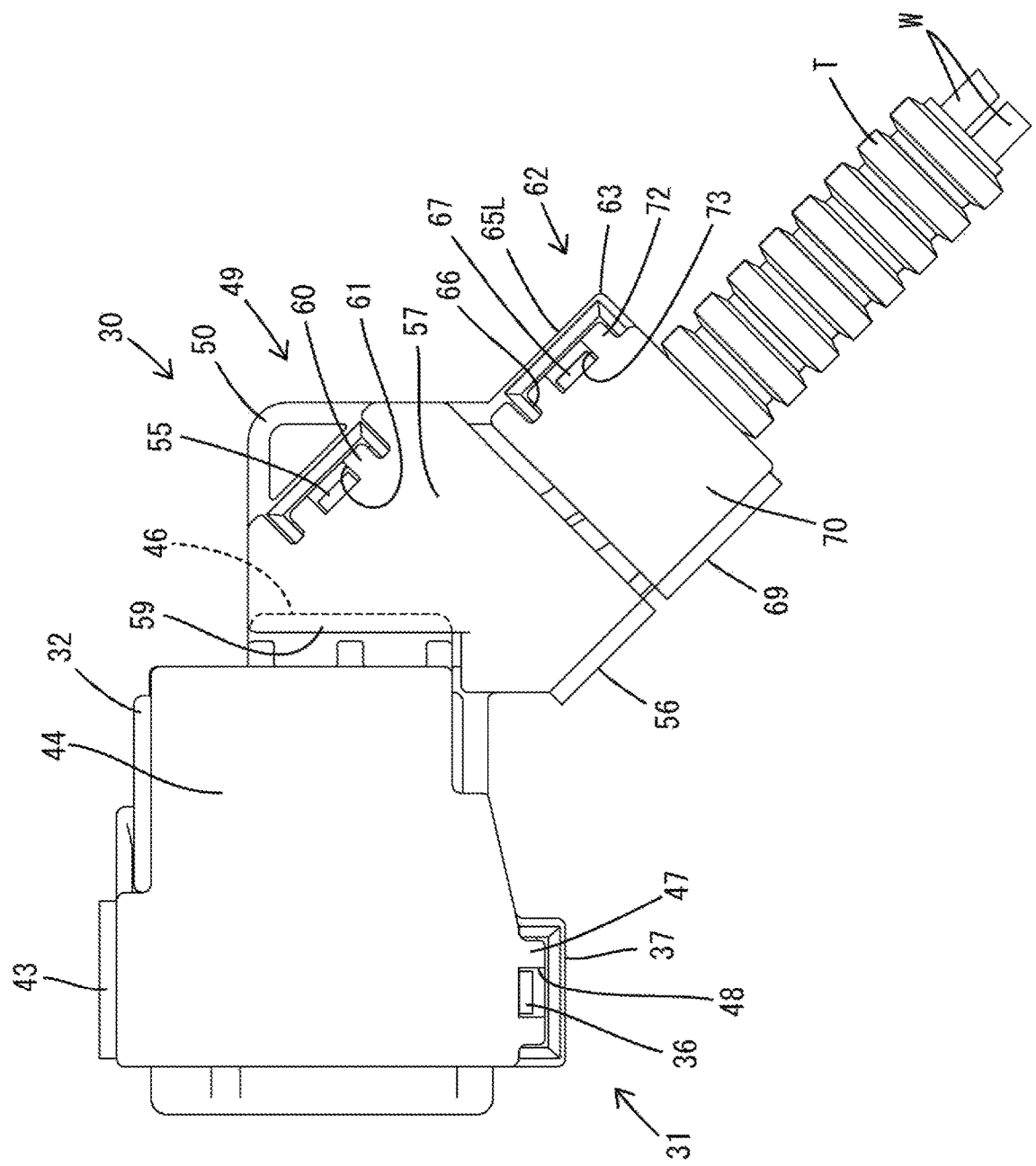
FIG. 3 is a plan view showing the assembled state of the connector.
Figure 4:
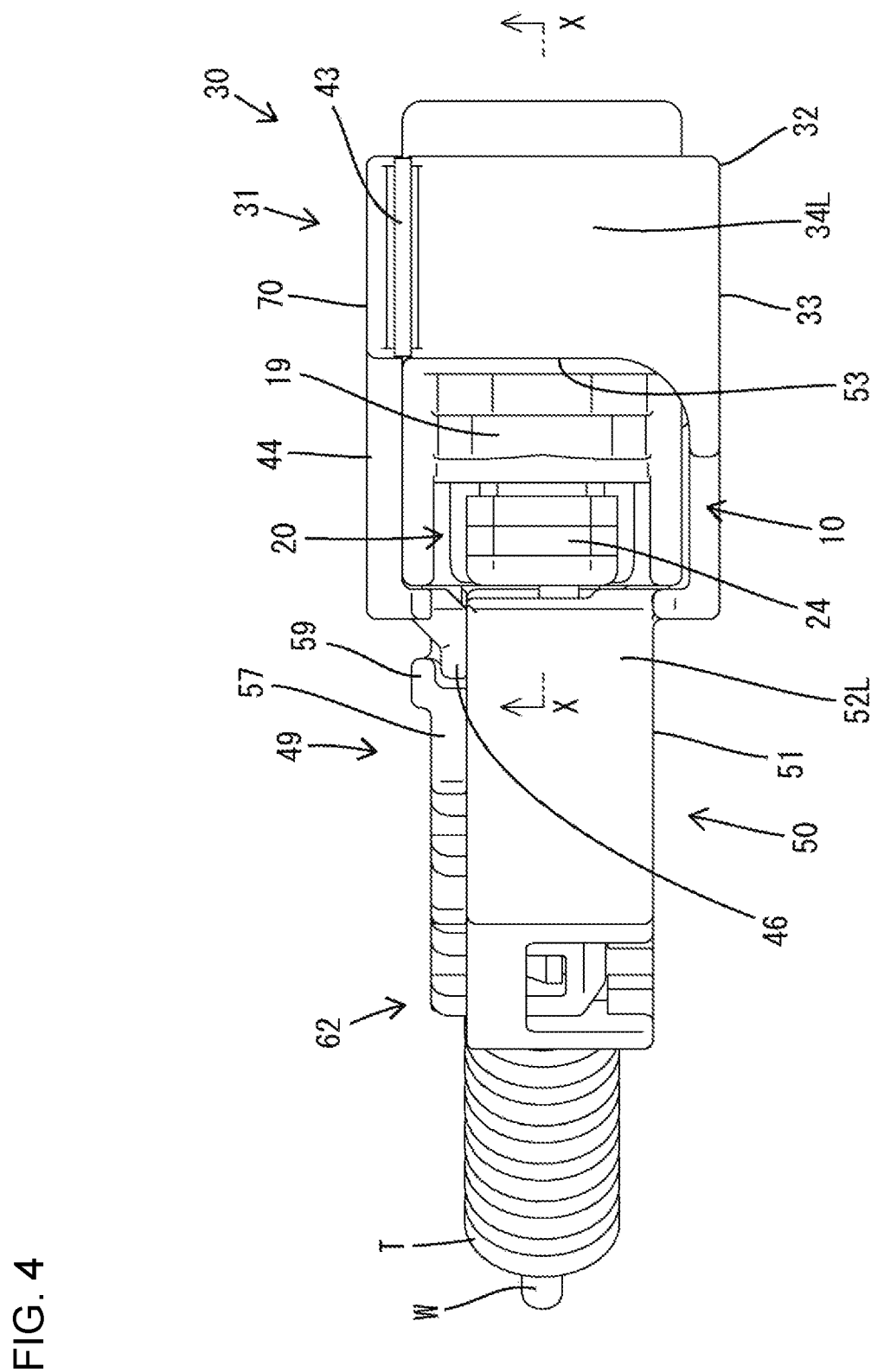
FIG. 4 is a side view showing the assembled state of the connector.

An area of the left outer side surface of the tubular holding portion 31 behind the left side wall portion 34L is open as the operation space 53 for opening the housing 10 to the outside of the wire cover 30 (tubular holding portion 31). In this operation space 53, a rear end area of the left outer wall portion 19 and the operating portion 24 of the lock arm 20 are exposed as shown in FIG. 4. Thus, an unlocking operation can be performed by pressing the operating portion 24 even in a state where the housing 10 and the wire cover 30 are assembled.

Thereafter, the wire lid portion 57 at the opening position is displaced to the closing position to close the opening 58 of the wire box portion 50. In this way, areas of the wires W exposed between the wire draw-out surface 12 and the front end of the corrugated tube T are covered by the wire lid portion 57, thereby constituting the wire surrounding portion 49 surrounding the exposed areas of the wires W over the entire periphery. With the wire lid portion 57 assembled with the wire box portion 50, the pressing portion 59 of the wire lid portion 57 overlaps on the outer surface of the receiving portion 46 on the rear end edge of the housing lid portion 44. In this way, an upward (direction away from the housing box portion 32) displacement of the housing lid portion 44 is restricted.

After the wire lid portion 57 is assembled with the wire box portion 50, the positioning lid portion 70 at the opening position is displaced to the closing position to close the opening 71 of the positioning box portion 63. In this way, the front end part of the corrugated tube T is covered by the positioning lid portion 70, thereby constituting the tubular positioning portion 62 surrounding the front end part of the corrugated tube T over the entire periphery. In the above manner, the assembling of the housing 10 and the wire cover 30 is completed.

In connecting the connector configured as described above to a mating connector (not shown), the lock arm 20 interferes with the mating lock receiving portion 46 to be resiliently displaced in an unlocking direction. Further, in separating the connector and the mating connector in the connected state, the operating portion 24 is pressed to resiliently displace the lock arm 20 in the unlocking direction. At this time, the lock arm 20 is inclined like a seesaw in a plan view and the lock functioning portion 22 enters the cut portion 25. Since the projection 38 of the wire cover 30 is accommodated in the cut portion 25, the lock functioning portion 22 may interfere with the projection 38.

In view of this point, the projection 38 is formed with the inclined surface 40 obliquely cut with respect to the left side wall portion 34L in a plan view. By making a projecting dimension of the projection 38 from the left side wall portion 34L larger in this way, it is realized to avoid the interference of the lock arm 20 (lock functioning portion 22) and the projection 38 while ensuring a sufficient locking margin between the projection 38 and the cut portion 25.

Further, since the front end part of the lock functioning portion 22 projects outwardly (leftwardly) of the left outer wall portion 19 through the cut portion 25 when the lock arm 20 is resiliently displaced, the front end part of the lock functioning portion 22 may interfere with the inner surface of the left side wall portion 34L. However, in this embodiment, the left side wall portion 34L is formed with the escaping portion 41 by recessing the inner surface thereof, wherefore there is no possibility that the lock functioning portion 22 and the left side wall portion 34L interfere with each other.

As described above, the connector of this embodiment includes the housing 10 having the wires W drawn out from the wire draw-out surface 12 on the rear end and including the cut portion 25 open in the outer peripheral surface, and the wire cover 30 to be mounted on the housing 10. The wire cover 30 includes the tubular holding portion 31 configured to surround the outer periphery of the housing 10 over the entire periphery, and the projection 38 formed on the inner surface of the tubular holding portion 31. The projection 38 restricts forward separation of the housing 10 from the tubular holding portion 31 by being fit into the cut portion 25. According to this configuration, since a front stop wall to which the front end surface of the housing 10 is to be locked needs not be formed on the front end of the tubular holding portion 31, the wire cover 30 can be miniaturized in the front-rear direction.

Further, the tubular holding portion 31 includes the housing box portion 32 formed with the projection 38 and the housing lid portion 44 configured to open and close the opening 44 of the housing box portion 32. The resilient lock piece 47 formed on the housing lid portion 44 is locked to the lock projection 36 of the housing box portion 32 to cover the outer surface of the right side wall portion 34R, and the both left and right side wall portions of the housing box portion 32 are restricted from being expanded and deformed by this locking action. Since a displacement of the projection 38 in a direction to be disengaged from the cut portion 25 is restricted by restricting the expansion deformation of the housing box portion 32, the projection 38 and the cut portion 25 are reliably fit.

Further, the housing box portion 32 includes the bottom wall portion 33 and the pair of left and right side wall portions 34L, 34R rising upward from the side edge parts of the bottom wall portion 33, and the housing lid portion 44 is connected to the rising end edge of the left side wall portion 34L via the first hinge portion 43. According to this configuration, since the housing box portion 32 and the housing lid portion 44 are configured as a single component, wherefore the number of components can be reduced.

Further, the tapered guiding surface 39 facing toward the opening 42 (obliquely upward) in the upper surface of the housing box portion 32 is formed on the upper end part of the projection 38. According to this configuration, in dropping the housing 10 from above to be mounted into the housing box portion 32, the housing 10 slides in contact with the tapered guiding surface 39 when coming into contact with the upper end part of the projection 38. Thus, there is no possibility that the housing 10 and the projection 38 catch each other.

Further, the wire cover 30 includes the wire surrounding portion 49 connected to the rear end of the tubular holding portion 31 and configured to surround the wires W, and the wire surrounding portion 49 includes the wire box portion 50 connected to the housing box portion 32 and the wire lid portion 57 configured to open and close the opening 58 of the wire box portion 50. When the wire lid portion 57 closes the opening 58 of the wire box portion 50, the pressing portion 59 of the wire lid portion 57 may overlap on the outer surface of the receiving portion 46 of the housing lid portion 44. According to this configuration, the pressing portion 59 of the wire lid portion 57 overlaps on the outer surface of the receiving portion 46 of the housing lid portion 44, whereby the opening of the housing lid portion 44 is restricted. Thus, the housing 10 can be reliably held in the tubular holding portion 31.

Further, the cut portion 25 of the housing 10 penetrates through the left outer wall portion 19 covering the outer surface of the lock arm 20 to expose a part (lock functioning portion 22) of the lock arm 20. When the lock arm 20 is resiliently displaced, the lock functioning portion 22 is resiliently displaceable toward the cut portion 25. Since the projection 38 is arranged at such a position as not to interfere with the lock functioning portion 22, there is no possibility that a resilient displacement of the lock arm 20 is hindered by the projection 38. Further, the escaping portion 41 configured to avoid interference with the lock arm 20 (lock functioning portion 22) when the lock arm 20 is resiliently displaced is formed in the inner surface of the tubular holding portion 31 (left wire surrounding portion 34L). Thus, there is no possibility that a resilient displacement of the lock arm 20 is hindered by the tubular holding portion 31.

The invention is not limited to the above described and illustrated embodiment. For example, the following embodiments also are included in the scope of the invention.

The housing lid overlaps on the outer surface of the housing box in the above embodiment, but the housing lid may overlap on the inner surface of the housing box.

Although the housing box and the housing lid are integrated in the above embodiment, the housing box and the housing lid may be separate components.

Although the projection is formed with the tapered guiding surface in the above embodiment, the projection may have no tapered guiding surface.

The wire lid overlaps on the outer surface of the housing lid in the above embodiment, the wire lid may not overlap on the outer surface of the housing lid.

Although the wire box and the wire lid are integrated in the above embodiment, the wire box and the wire lid may be separate components.

The cut portion penetrates through the outer wall covering the outer surface of the lock arm to expose a part of the lock arm in the above embodiment, but the invention is also applicable in the case where the cut portion does not expose a part of the lock arm.

Although the tubular holding portion surrounds the outer periphery of the housing over the entire periphery in the above embodiment, the tubular holding portion may surround only a part of the outer periphery of the housing.

LIST OF REFERENCE SIGNS

10 . . . housing
12 . . . wire draw-out surface

18 . . . right outer wall (outer wall)
19 . . . left outer wall (outer wall)
20 . . . lock arm
25 . . . cut portion
30 . . . wire cover
31 . . . tubular holding portion
32 . . . housing box
33 . . . bottom wall
34L . . . left wire surrounding portion (wire surrounding portion)
34R . . . right wire surrounding portion (wire surrounding portion)
38 . . . projection
39 . . . guiding surface
41 . . . escaping portion
42 . . . opening of housing box
43 . . . first hinge (hinge)
44 . . . housing lid portion
49 . . . wire surrounding portion
50 . . . wire box
57 . . . wire lid
58 . . . opening of wire box
W . . . wire

What is claimed is:

1. A wire cover to be mounted on a housing having a wire drawn out from a wire draw-out surface on a rear end and including a cut portion open in an outer peripheral surface, comprising:
    a tubular holding portion having a housing box configured to surround an outer periphery of the housing and a housing lid configured to open and close an opening in the housing box, the housing lid being locked the housing box while overlapping an outer surface of the housing box to restrict deformation of the housing box;
    a projection formed on an inner surface of the housing box and configured to restrict forward separation of the housing from the tubular holding portion by being fit into the cut portion; and
    a wire surrounding portion connected to a rear end of the tubular holding portion and configured to surround the wire, the wire surrounding portion including a wire box connected to the housing box and a wire lid configured to open and close an opening in the wire box, and the wire lid overlapping an outer surface of the housing lid.

2. The wire cover of claim 1, wherein:
    the housing box includes a bottom wall and two side walls rising from sides of the bottom wall; and
    the housing lid is connected to a rising end edge of one of the side walls via a hinge.

3. The wire cover of claim 1, comprising a tapered guiding surface formed on the projection and facing toward the opening of the housing box.

4. A connector, comprising:
    a housing having a wire drawn out from a wire draw-out surface on a rear end and including a cut portion penetrating through an outer wall portion to expose a portion of a lock arm, the lock arm being resiliently deplaceable towards the cut portion;
    a wire cover to be mounted on the housing;
    a tubular holding portion constituting the wire cover and configured to surround an outer periphery of the housing;
    a projection formed on an inner surface of the tubular holding portion and configured to restrict forward separation of the housing from the tubular holding portion by being fit into the cut portion; and
    an escaping portion for a portion of the resiliently deformed lock arm recessed into the inner surface of the tubular holding portion and configured to avoid interference between the lock arm and the tubular holding portion.

* * * * *